United States Patent Office 3,338,969
Patented Aug. 29, 1967

3,338,969
A-NOR-B-HOMO-ESTRANE AND PROCESS OF PREPARATION
Georges Muller, Nogent-sur-Marne, Seine, and André Poittevin, Les Lilas, Seine, France, assignors to Roussel-UCLAF, Paris, France, a corporation of France
No Drawing. Filed Feb. 20, 1964, Ser. No. 346,079
Claims priority, application France, Feb. 27, 1963, 926,226
7 Claims. (Cl. 260—586)

The present invention relates to a new A-nor-B-homo-estrane and a process for its preparation. It more particularly relates to 17α-ethyl-A-nor-B-homo-10ξ-estrane-17β-ol of Formula I:

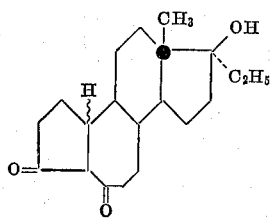

as well as its enolic forms, and 17β organic esters thereof.

The preferred compounds of the invention are thus 17α-ethyl-A-nor-B-homo-10ξ-estrane-17β-ol-3,6-dione and its enolic forms.

The compounds of Formula I possess interesting pharmacological properties. They present particularly an important anabolic action.

Other compounds possessing anabolic action are already known; such as for example, 17α-ethyl-19-nor-Δ⁴-androstene - 17β - ol-3-one. However, we have just discovered now that 17α-ethyl-A-nor-B-homo-10ξ-estrane-17β-ol-3,6-dione and its 17β organic esters, the object of the invention, are approximately five times more anabolic than 17α - ethyl-19-nor-Δ⁴-androstene-17β-ol-3-one, while presenting only a slight androgenic action.

It is an object of the present invention to obtain an A-nor-B-homo-estrane selected from the group consisting of compounds of the formula

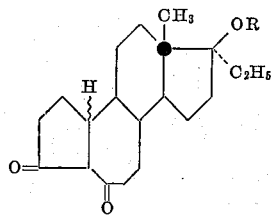

wherein R is a member selected from the group consisting of hydrogen and the acyl radical of a hydrocarbon carboxylic acid having from 1 to 18 carbon atoms, and its $\Delta^{3(5)}$ and $\Delta^{5(6)}$ enolic forms.

A further object of the present invention is the development of a process for the production of an A-nor-B-homo-estrane selected from the group consisting of compounds of the formula

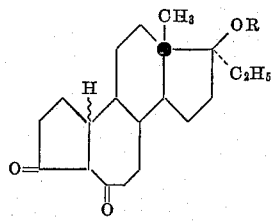

wherein R is a member selected from the group consisting of hydrogen and the acyl radical of a hydrocarbon carboxylic acid having from 1 to 18 carbon atoms, and its $\Delta^{3(5)}$ and $\Delta^{5(6)}$ enolic forms, which comprises the steps of subjecting a compound of the formula

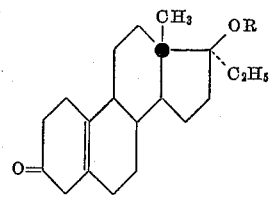

wherein R has the above-assigned meaning, to the action of ozone in an inert solvent, reducing the resultant ozonide by the action of a lower alkyl phosphite, cyclizing the resultant 5,10 seco compound of the formula

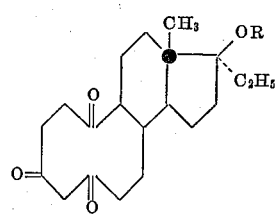

wherein R has the above-assigned meaning, by the action of an acid dehydrating agent, selectively hydrogenating the resultant $\Delta^{5(10)}$ compound of the formula

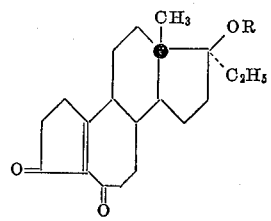

wherein R has the above-assigned meaning, by the action of an alkali metal borohydride in an acidic media and recovering said A-nor-B-homo-estrane.

Another object of the invention is the obtention of the novel intermediates:
(A) A 5,10-seco-estrane of the formula

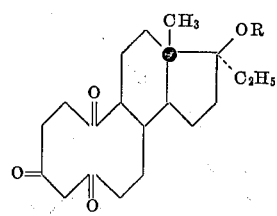

wherein R is a member selected from the group consisting of hydrogen and the acyl radical of a hydrocarbon carboxylic acid having from 1 to 18 carbon atoms.
(B) A $\Delta^{5(10)}$-A-nor-B-homo-estrene of the formula

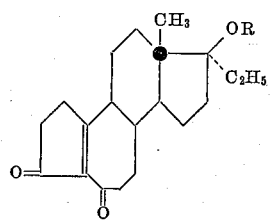

wherein R is a member selected from the group consisting of hydrogen and the acyl radical of a hydrocarbon carboxylic acid having from 1 to 18 carbon atoms.

(C) The 3 mono-oxime of 17α-ethyl-A-nor-B-homo-10ξ-estrane-17β-OR-3,6-dione wherein R is a member selected from the group consisting of hydrogen and the acyl radical of a hydrocarbon carboxylic acid having from 1 to 18 carbon atoms.

(D) The cupric complex of 17α-ethyl-A-nor-B-homo-10ξ-estrane-17β-OR-3,6-dione wherein R is a member selected from the group consisting of hydrogen and the acyl radical of a hydrocarbon carboxylic acid having from 1 to 18 carbon atoms.

A still further object of the invention is the development of a process for the promotion of proteidic anabolism in warm blooded animals which comprises administering a safe but effective dose of an A-nor-B-homo-estrane seleced from the group consisting of compounds of the formula

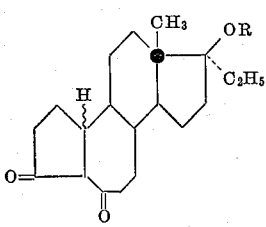

wherein R is a member selected from the group consisting of hydrogen and the acyl radical of hydrocarbon carboxylic acid having from 1 to 18 carbon atoms, and its $\Delta^{3(5)}$ and $\Delta^{5(6)}$ enolic forms.

Still another object of the invention is to provide novel anabolisant compositions.

These and other objecs of the invention will become more apparent as the description thereof proceeds.

The invention also includes the process of preparing the compound of Formula I. This process is illustrated by the flow diagram of Table I.

TABLE I

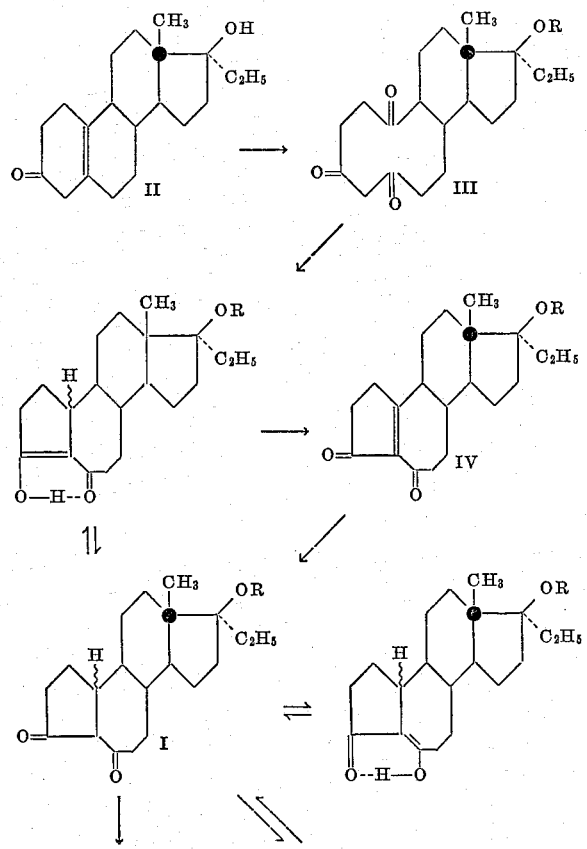

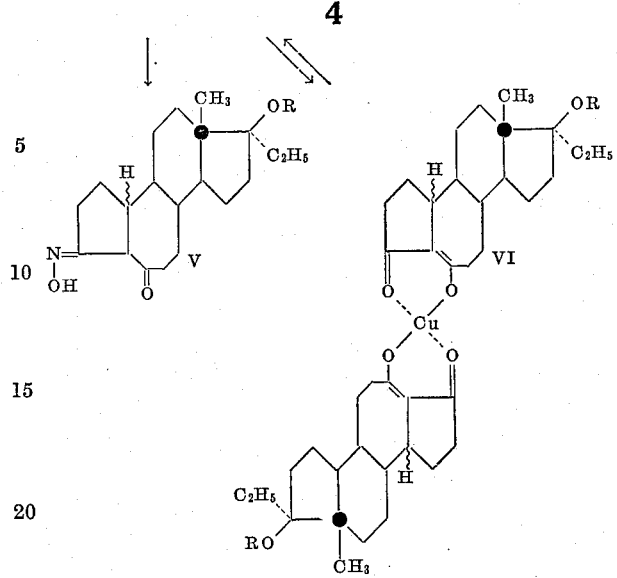

The said process is characterized essentially in that the 17α-ethyl-$\Delta^{5(10)}$-estrene-17β-OR-3-one (II) is subjeced to the action of ozone in an inert solvent. The resultant ozonide is reduced by the action of a lower alkyl phosphite. The 17α-ethyl-5,10-seco-estrane-17β-OR-3,5,10-trione (III) so formed is cyclized by means of an acid dehydrating agent. The $\Delta^{5(10)}$-double bond of the 17α-ethyl-A-nor-B-homo-$\Delta^{5(10)}$-estrene-17β-OR-3,6-dione (IV) obtained is selectively hydrogenated by the action of an alkali metal borohydride in an acidic media and 17α-ethyl-A-nor-B-homo-10ξ-estrane-17β-OR-3,6-dione is isolated.

In a preferential method of execution, the process of the invention is further characterized by the following points:

(a) The starting compound is 17α-ethyl-$\Delta^{5(10)}$-estrene-17β-ol-3-one.

(b) Ozone is made to react on 17α-ethyl-$\Delta^{5(10)}$-estrene-17β-ol-3-one in a mixture of hydroxylated solvent and another solvent inert under the conditions of the reaction, such as a mixture of methanol and methylene chloride and the reaction is conducted at temperatures of from —90° C. to —30° C., preferably at about —70° C.

(c) The lower alkyl phosphite that is used to reduce the ozonide is trimethyl phosphite, the reaction temperature being as low as before.

(d) The acid dehydration agent by means of which the cyclization is effected is a concentrated aqueous acidic solution such as concentrated aqueous acetic acid and the reaction is conducted at the reflux temperature.

(e) The alkali metal borohydride by means of which the selective reduction of the $\Delta^{5(10)}$-double bond is effected is potassium borohydride and the reaction is conducted in a solution of acetic acid in an inert solvent such as methanol at temperatures from about —50° C. to 0° C., preferably about —40° C.

It is also evident that the process of the invention is equally applicable when the starting product is esterified in the 17-position by a hydrocarbon carboxylic acid having from 1 to 18 carbon atoms. In this case the corresponding 17α-ethyl-17β-acyloxy-A-nor-B-homo-10ξ-estrane-3,5-dione is obtained. Examples of suitable acids are alkanoic acids, such as formic acid, acetic acid, propionic acid, butyric acid, isobutyric acid, valeric acid, isovaleric acid, trimethyl acetic acid, caproic acid, β-trimethylpropionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenylacetic acid and phenylpropionic acid; aryl carboxylic acids such as benzoic acid and 2,4-dinitrobenzoic acid; phenoxy alkanoic acids such as phenoxyacetic acid, p-chlorophenoxy acetic acid, 2,4-dichlorophenoxy acetic acid, 4-tert.-butylphenoxy acetic acid, 3-phenoxy propionic acid and 4-phenoxy butyric acid; heterocyclic carboxylic acids such as furane-2-carboxylic acid, 5-tert.-butylfurane-2-carboxylic acid, 5-bromofurane-2-carboxylic acid and nicotinic acids; β-ketoalkanoic acids such as acetylacetic acid, propionylacetic acid and butrylacetic acid; amino acids such as diethylaminoacetic acid and aspartic acid.

The following examples are given as indicative and enable a better comprehension of the invention. It is obvious however, to one skilled in the art, that other expedients may be employed.

EXAMPLE I

Preparation of 17α-ethyl-A-nor-B-homo-10ξ-estrane-17β-ol-3,6-dione (I, R=H)

STEP A.—PREPARATION OF 17α-ETHYL-5,10-SECO-ESTRANE-17β-OL-3,5,10-TRIONE (III, R=H)

2 gm. of 17α-ethyl-$\Delta^{5(10)}$-estrene-17β-ol-3-one (II, R=H) were dissolved in a balloon flask in a mixture of 15 cc. of methylene chloride and 15 cc. of methanol. The reaction mixture was cooled to −70° C. and ozone was made to bubble through the solution for a period of 25 minutes. The excess of ozone was next removed by a current of nitrogen then 1 cc. of trimethyl phosphite was added drop by drop.

Next the reaction mixture was allowed to rise to a temperature of 0° C. 20 cc. of hydrogen peroxide solution were added thereto in order to destroy the excess of trimethyl phosphite. Thereafter, the solution was poured in water. The aqueous solution was extracted three times with methylene chloride. The decanted organic phases were washed with water, filtered and distilled under vacuum. The dry residue was taken up in ether from which it crystallized. 1.6 gm. of crystallized product were thus obtained melting at 169° C. After two recrystallizations from isopropyl ether, then from acetone, 0.9 gm. of 17α-ethyl-5,10-seco-estrane-17β-ol-3,5,10-trione (III, R=H) were recovered as a colorless crystallized product, soluble in alcohol and chloroform, slightly soluble in ether, and insoluble in water. The product melted at 172° C. and had a specific rotation $[\alpha]_D^{20}=-41.60\pm1.5°$ (c=0.8% in chloroform).

Analysis.—$C_{20}H_{30}O_4$; molecular weight=334.44. Calculated: C, 71.82%; H, 9.04%; O, 19.14%. Found: C, 71.8%; H, 9.1%; O, 18.7%.

The I.R. spectra shows the presence of an OH group and two carbonyl groups at about 1,700 cm.$^{-1}$ and about 1,715 cm.$^{-1}$.

This product is not described in the literature.

The starting compound, 17α-ethyl-$\Delta^{5(10)}$-estrene-17β-ol-3-one (II, R=H) was obtained according to the process described by Colton et al. (J. of Am. Chem. Soc., 1957, 79, 1123).

STEP B.—PREPARATION OF 17α-ETHYL-A-NOR-B-HOMO-$\Delta^{5(10)}$-ESTRENE-17β-OL-3,6-DIONE (IV, R=H)

6.8 gm. of 17α-ethyl-5,10-seco-estrane-17β-ol-3,5,10-trione (III, R=H) were introduced in 30 cc. of 90% acetic acid solution and the reaction mixture was heated to reflux for a period of 15 minutes. Thereafter, the reaction mixture was cooled and poured into water. The solution was extracted three times with methylene chloride. The methylene chloride phase was combined, washed twice with water and one time with a solution of very dilute sodium bicarbonate. The methylene chloride phase was then dried over magnesium sulfate, filtered and distilled to dryness under vacuum. The dry residue was taken up by a mixture of ethyl acetate and ether from which it crystallized. 3 gm. of a product melting at 165° C. were obtained. This product was purified by recrystallization from isopropyl ether and the mixture of ethyl acetate and ether. 17α-ethyl-A-nor-B-homo-$\Delta^{5(10)}$-estrene-17β-ol-3,6-dione (IV, R=H) was thus obtained in the form of a beige crystallized product, soluble in alcohol and acetone and slightly soluble in ether. The product melted at 115° C., then at 166° C. and had a specific rotation $[\alpha]_D^{20}=+15°\pm1°$ (chloroform).

Analysis.—$C_{20}H_{28}O_3$; molecular weight=316.42. Calculated: C, 75.91%; H, 8.92%. Found: C, 75.7%; H, 8.8%.

The I.R. spectra shows the presence of an OH group, of a fixed and strong band towards 1,720 cm.$^{-1}$ and two bands at about 1,670 cm.$^{-1}$ and 1,608 cm.$^{-1}$.

This product is not described in the literature.

STEP C.—PREPARATION OF 17α-ETHYL-A-NOR-B-HOMO-10ξ-ESTRANE-17β-OL-3,6-DIONE (I, R=H)

500 mg. of 17α-ethyl-A-nor-B-homo-$\Delta^{5(10)}$-estrene-17β-ol-3,6-dione (IV, R=H) were introduced into 15 cc. of methanol. The reaction mixture was cooled to −40° C. and, under agitation, 2.7 cc. of acetic acid and 100 mg. of potassium borohydride were added. The agitation was continued for a period of 15 minutes, then the solution was poured into water. The aqueous solution was extracted three times with methylene chloride. The combined methylene chloride phases were separated, then washed two times with water, and dried over magnesium sulfate, filtered and distilled to dryness under vacuum. 500 mg. of 17α-ethyl-A-nor-B-homo-10ξ-estrane 17β-ol-3,6-dione (I, R=H) were obtained in the form of a clear yellow amorphous product which was soluble in alcohol, ether, acetone and chloroform. The product was characterized by its oxime and by its cupric complex. The I.R. spectra shows the presence of an elevated percentage of the chelated enolic form.

This product is not described in the literature.

EXAMPLE II

Preparation of the 3 oxime (V, R=H)

500 mg. of 17α-ethyl-A-nor-B-homo-10ξ-estrane-17β-ol-3,6-dione (I, R=H) were introduced into 4 cc. of a 90% methanol solution. 200 mg. of sodium acetate and 100 mg. of hydroxylamine hydrochloride were added thereto. The reaction mixture was heated to reflux for a period of 30 minutes. Thereafter the reaction mixture was cooled, poured into water and extracted two times with methylene chloride. The methylene chloride phases were separated, combined, washed two times with water, dried over magnesium sulfate, filtered and distilled to dryness under vacuum. The oxime of 17α-ethyl-A-nor-B-homo-10ξ-estrane-17β-ol-3,6-dione (V, R=H) was taken up with chloroform, from which it crystallized. The product was recrystallized in ethyl acetate, then from a mixture of methylene chloride and isopropyl ether.

The 3 oxime of 17α-ethyl-A-nor-B-homo-10ξ-estrane-17β-ol-3,6-dione (V, R=H) is a colorless crystallized product, soluble in alcohol and slightly soluble in ether and chloroform. The product melted at 146° C. and had a specific rotation $[\alpha]_D^{20}=173°\pm3°$ (c=0.5% in ethanol).

Analysis.—$C_{20}H_{31}O_3N$; molecular weight=333.46. Calculated: C, 72.03%; H, 9.37%; N, 4.20%. Found: C, 71.7%; H, 9.4%; N, 4.3%

The I.R. spectra shows the presence of an OH group, the absence of non-conjugated and conjugated ketones, and the presence of a small band towards 1,605 cm.$^{-1}$.

This product is not described in the literature.

EXAMPLE III

Preparation of the cupric complex (VI, R=H)

500 mg. of 17α-ethyl-A-nor-B-homo-10ξ-estrane-17β-ol-3,6-dione (I, R=H) were dissolved in 20 cc. of a 90% methanol solution. 250 mg. of copper acetate were introduced thereafter under agitation. A precipitate of fine green crystals was formed. The agitation was continued for a period of 15 minutes and the reaction mixture was thereafter poured into water. The aqueous phase was extracted two times with methylene chloride. The methylene chloride phase was separated, combined, washed two times with water, dried over magnesium sulfate, filtered and distilled to dryness under vacuum. The product was purified by three successive crystallizations from methanol. 280 mg. of the cupric complex of 17α-ethyl-A-nor-B-homo-10ξ-estrane-17β-ol-3,6-dione (VI, R=H) were thus obtained. The product was obtained in the form of green crystals, soluble in chloroform, slightly soluble in alcohol and very slightly soluble in ether. The product melted toward 210° C.

Analysis.—$C_{40}H_{58}O_6Cu$; molecular weight=698.40. Calculated: C, 68.77%; H, 8.38%. Found: C, 69.1%; H, 8.3%.

The I.R. spectra shows the presence of the OH group and of two strong bands at about 1,580 cm.$^{-1}$ and 1,475 cm.$^{-1}$ in accord with a chelated structure.

This product is not described in the literature.

Hydrolysis of the cupric complex 650 mg. of the cupric complex (VI, R=H) were placed in suspension in 15 cc. of methanol and 5 cc. of methylene chloride. 10 cc. of 2 N hydrochloric acid were added thereto under agitation. A green solution was obtained which decolorized little by little. The agitation was continued for a period of 5 minutes after decolorization. The solution was then poured into water and extracted three times with methylene chloride. The combined methylene chloride phases were washed two times with water, dried over magnesium sulfate, filtered and distilled under vacuum. 550 mg. of an amorphous product were obtained which was purified by passage through alumina. 535 mg. of 17α-ethyl-A-nor-B-homo-10ξ-estrane-17β-ol-3,6-dione (I, R=H) were thus obtained in the form of a clear yellow amorphous product identical to that obtained in Example I.

As has been mentioned above, 17α-ethyl-A-nor-B-homo-10ξ-estrane-17β-ol-3,6-dione is possessed of interesting pharmacological properties. It presents particularly an important anabolic action.

It can be utilized for the treatment of disturbances of proteidic anabolism, asthenia, thinness, osteosporosis, senescence, metabolic disturbances from prolonged cortico-therapy.

The 17α-ethyl-A-nor-B-homo-10ξ-estrane-17β-ol-3,6-dione is utilized orally, perlingually, transcutaneously and rectally.

It can be prepared in the form of injectable solutions or suspensions, prepared in ampules or in multiple-dose flacons, in the form of tablets, coated tablets, glossettes and suppositories.

The useful dosology is controlled between 2 and 20 mg. per dose and 10 and 30 mg. per day in the adult as a function of the method of administration. The pharmaceutical forms such as injectable solutions or suspensions, tablets, coated tablets, glossettes and suppositories are prepared according to the usual processes.

EXAMPLE IV

Pharmacological study of 17α-ethyl-A-nor-B-homo-10ξ-estrane-17β-ol-3,6-dione STUDY OF THE ANDROGENIC AND ANABOLIC ACTIVITY OF 17α-ETHYL-A-NOR-B-HOMO-10ξ-ESTRANE-17β-OL-3,6-DIONE The tests were effected according to the Hershberger technique (Proc. Soc. Exp. Biol. Med., 1953, 83, 175) slightly modified. This consists of a daily administration of the compound studied to male rats castrated at the age of 3½ weeks. The rats were treated the next day after the castration for a period of 10 days except on Sunday, then sacrificed the eleventh day, 22 to 26 hours after the last administration. The animals were autopsied after the sacrifice and the organs of interest were separated and weighed, in particular, the kidneys, the lifter muscle of the anus (Levator ani) in order to study the myotrophic and anabolic action as well as the ventral prostate and the seminal vesicles in order to study the simultaneous androgenic effect.

The 17α-ethyl-A-nor-B-homo-10ξ-estrane-17β-ol-3,6-dione was administered orally at total doses for the test period of 2 mg. and 10 mg. per rat.

The results obtained are resumed in Table II, following, which contains as a comparative example the results obtained with 17α-ethyl-19-nor-Δ$^4$-androstene-17β-ol-3-one administered at the same doses.

The symbols utilized hereafter represent:

$$Rf = \frac{\text{Weight of fresh kidneys} \times 1{,}000}{\text{Body weight}}$$

$$Rs = \frac{\text{Weight of dried kidneys} \times 1{,}000}{\text{Body weight}}$$

$$Lf = \frac{\text{Weight of fresh Levator ani} \times 1{,}000}{\text{Body weight}}$$

$$Ls = \frac{\text{Weight of dried Levator ani} \times 1{,}000}{\text{Body weight}}$$

TABLE II

| Products administered orally | Body weight in gm. 1st day | Body weight in gm. Last day | Fresh kidneys, mg. | Rf | Dried kidneys, mg. | Rs | Fresh Levator ani, mg. | Lf | Dried Levator ani, mg. | Ls | Seminal vesicles, mg. | Prostate, mg. |
|---|---|---|---|---|---|---|---|---|---|---|---|---|
| Controls | 50 | 91 | 488.2 | 5.359 | 104.2 | 1.114 | 16.6 | 0.182 | 3.7 | 0.041 | 6.2 | 6.4 |
| 17α-ethyl-A-nor-B-homo-10ξ-estrane-17β-ol-3,6-dione (2 mg. in 10 days) | 49 | 93 | 518.4 | 5.569 | 107.5 | 1.115 | 39.0 | 0.423 | 7.6 | 0.082 | 12.9 | 23.4 |
| 17α-ethyl-A-nor-B-homo-10ξ-estrane-17β-ol-3,6-dione (10 mg. in 10 days) | 50 | 96 | 462.6 | 4.795 | 103.4 | 1.072 | 58.1 | 0.604 | 11.5 | 0.119 | 25.4 | 35.9 |
| 17α-ethyl-19-nor-Δ$^4$-androstene-17β-ol-3-one (2 mg. in 10 days) | 49 | 95 | 474.1 | 5.007 | 103.4 | 1.092 | 27.2 | 0.286 | 6.3 | 0.067 | 8.2 | 11.7 |
| 17α-ethyl-19-nor-Δ$^4$-androstene-17β-ol-3-one (10 mg. in 10 days) | 49 | 96 | 500.6 | 5.200 | 109.5 | 1.139 | 42.5 | 0.430 | 9.6 | 0.097 | 9.0 | 14.3 |

It can thus be determined that 17α-ethyl-A-nor-B-homo-10ξ-estrane-17β-ol-3,6-dione is approximately as anabolic at a total dose of 2 mg. as 17α-ethyl-19-nor-Δ$^4$-androstene-17β-ol-3-one at a total dose of 10 mg. and that it presents additionally only a slight androgenic action.

The 17β esters of 17α-ethyl-A-nor-B-homo-10ξ-estrane-17β-ol-3,6-dione with hydrocarbon carboxylic acids having from 1 to 18 carbon atoms, such as the 17β-acetoxy compound, have a comparable physiological activity.

The above examples are illustrative of the invention, but are not to be deemed limitative. It is obvious to one skilled in the art that equivalent techniques and modifications may be employed without departing from the spirit of the invention and the scope of the appended claims.

We claim:

1. A mixture of an A-nor-B-homo-estrane of the formula

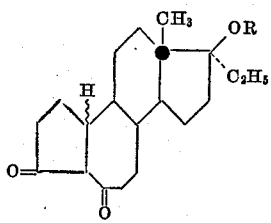

wherein R is a member selected from the group consisting of hydrogen and the acyl radical of an organic carboxylic acid having from 1 to 18 carbon atoms selected from the group consisting of alkanoic acids, alkenoic acids, cycloalkyl carboxylic acids, cycloalkylalkanoic acids, phenylalkanoic acids, and aryl hydrocarbon carboxylic acids, and its $\Delta^{3(5)}$ and $\Delta^{5(6)}$ enolic forms.

2. A mixture of 17α-ethyl-A-nor-B-homo-10-estrane-17β-ol-3,6-dione and its $\Delta^{3(5)}$ and $\Delta^{5(6)}$ enolic forms.

3. 17α-ethyl-A-nor-B-homo-10ξ - estrane - 17β - ol-3,6-dione.

4. A 5,10-seco-estrane of the formula

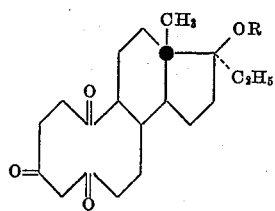

wherein R is a member selected from the group consisting of hydrogen and the acyl radical of an organic carboxylic acid having from 1 to 18 carbon atoms selected from the group consisting of alkanoic acids, alkenoic acids, cycloalkyl carboxylic acids, cycloalkylalkanoic acids, phenylalkanoic acids, and aryl hydrocarbon carboxylic acids.

5. 17α-ethyl-5,10-seco-estrane-17β-ol-3,5,10-trione.

6. A $\Delta^{5(10)}$-A-nor-B-homo-estrene of the formula

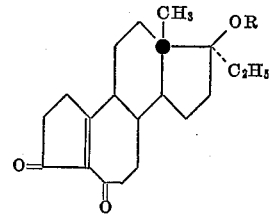

wherein R is a member selected from the group consisting of hydrogen and the acyl radical of an organic carboxylic acid having from 1 to 18 carbon atoms selected from the group consisting of alkanoic acids, alkenoic acids, cycloalkyl carboxylic acids, cycloalkylalkanoic acids, phenylalkanoic acids, and aryl hydrocarbon carboxylic acids.

7. 17α-ethyl-A-nor-B-homo-$\Delta^{5(10)}$ - estrene - 17β-ol-3,6-dione.

References Cited

UNITED STATES PATENTS 3,061,636   10/1962   Muller et al. _____ 260—488.8

OTHER REFERENCES

Velluz et al., Compt. Rend. vol. 252, pp. 4084 to 4086 (1961).

LEON ZITVER, Primary Examiner.

M. JACOB, Assistant Examiner.